Dec. 21, 1937.  E. V. FRANCIS  2,102,588
FUEL BURNING APPARATUS
Filed March 17, 1934   6 Sheets-Sheet 1

INVENTOR:
Earle V. Francis,
By
Chas. M. Nissen,
ATTY.

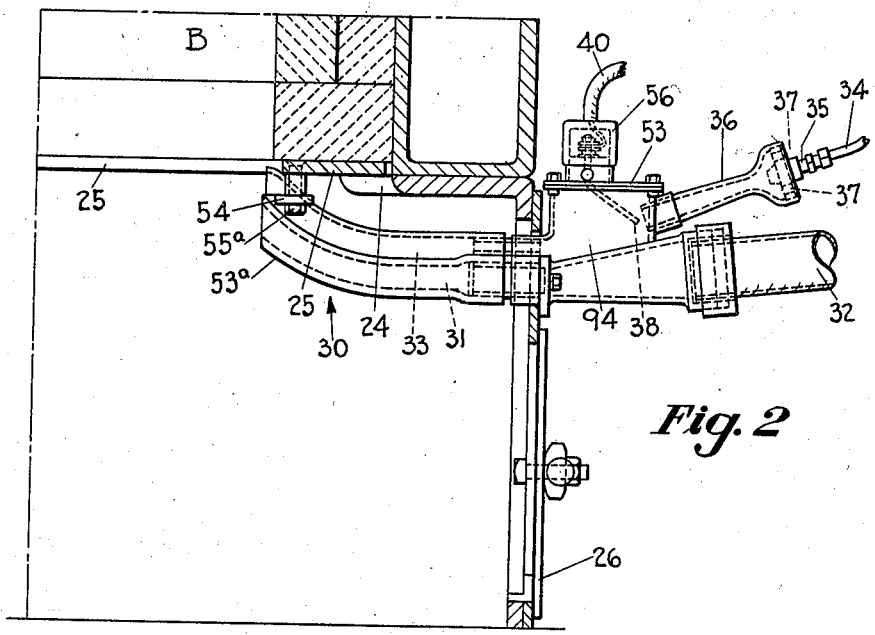
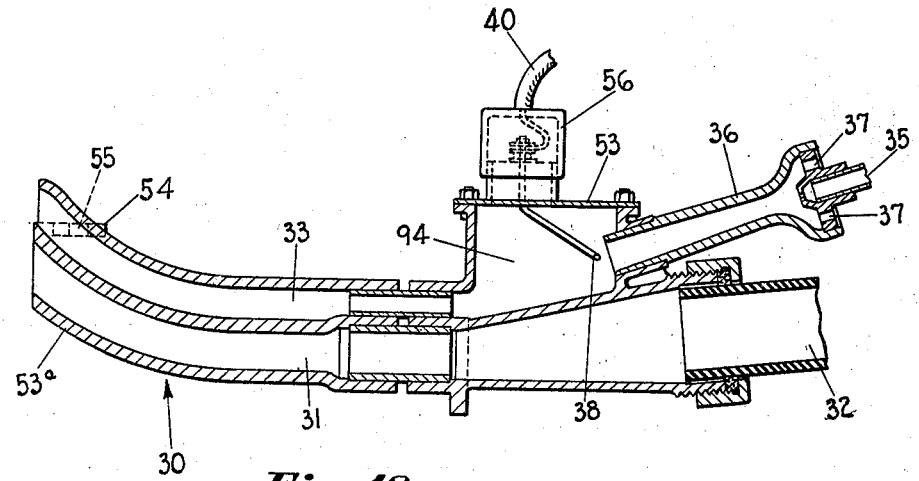

Dec. 21, 1937.                E. V. FRANCIS                 2,102,588
                          FUEL BURNING APPARATUS
                         Filed March 17, 1934         6 Sheets-Sheet 3

INVENTOR:
Earle V. Francis,
BY
Chas. M. Nissen,
ATT'Y.

Dec. 21, 1937. E. V. FRANCIS 2,102,588
FUEL BURNING APPARATUS
Filed March 17, 1934 6 Sheets-Sheet 4
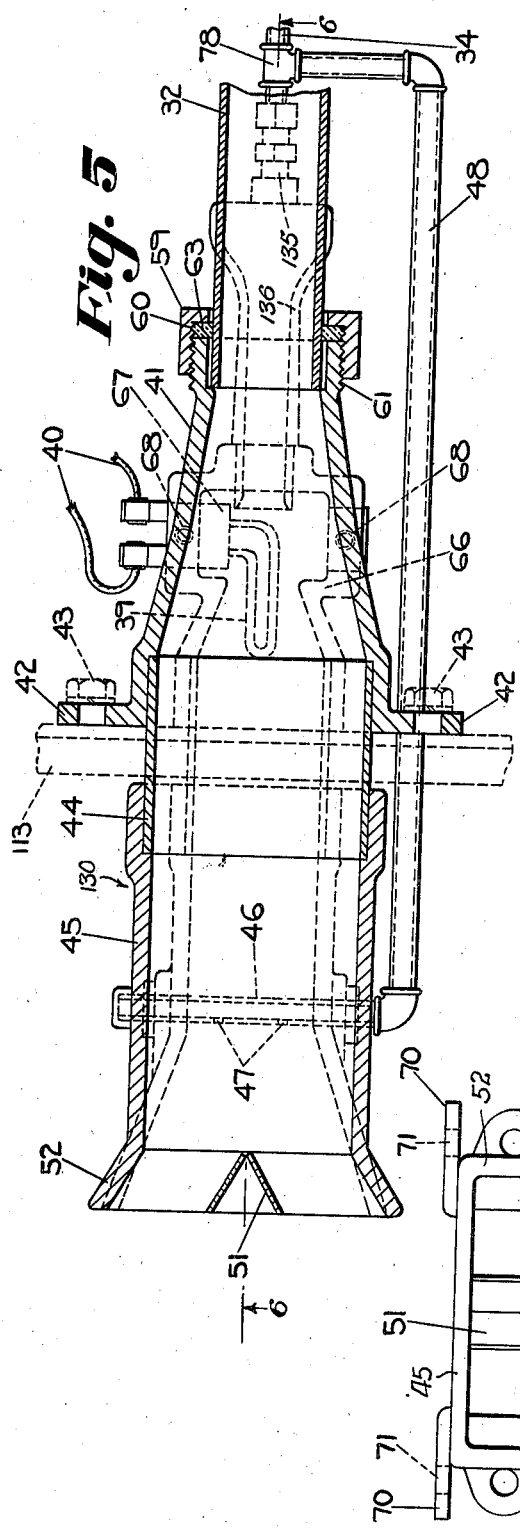
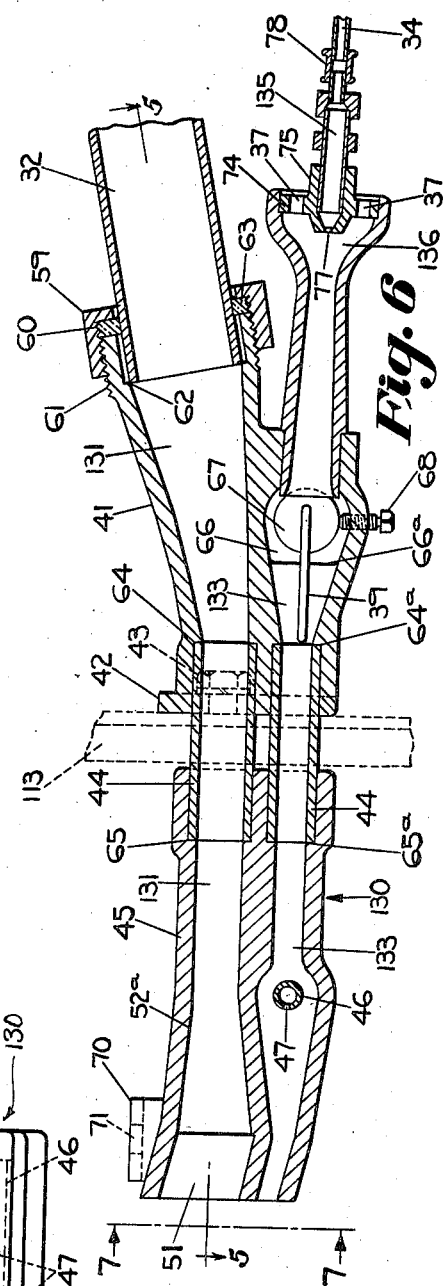
INVENTOR:
Earle V. Francis,
BY
Chas. M. Nissen,
ATT'Y Dec. 21, 1937.　　　　E. V. FRANCIS　　　2,102,588
FUEL BURNING APPARATUS
Filed March 17, 1934　　　6 Sheets-Sheet 5

INVENTOR:
Earle V. Francis,
BY
Chas. M. Nissen,
ATTY.

Dec. 21, 1937.  E. V. FRANCIS  2,102,588
FUEL BURNING APPARATUS
Filed March 17, 1934  6 Sheets-Sheet 6
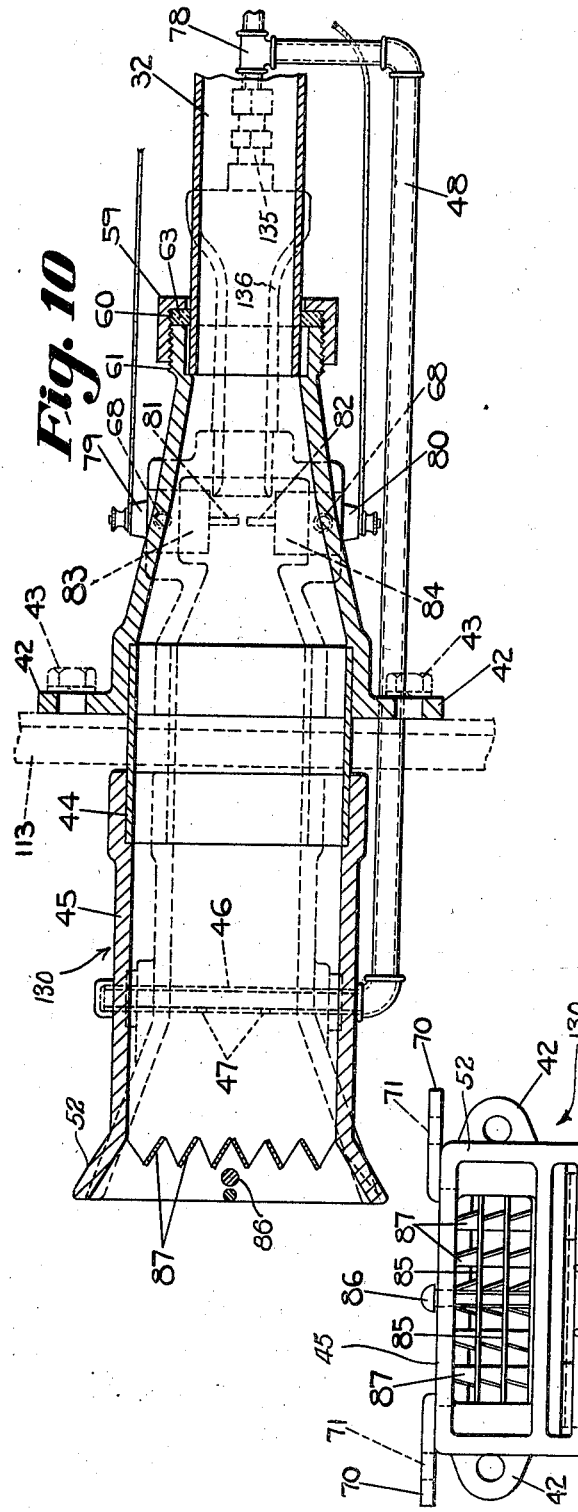
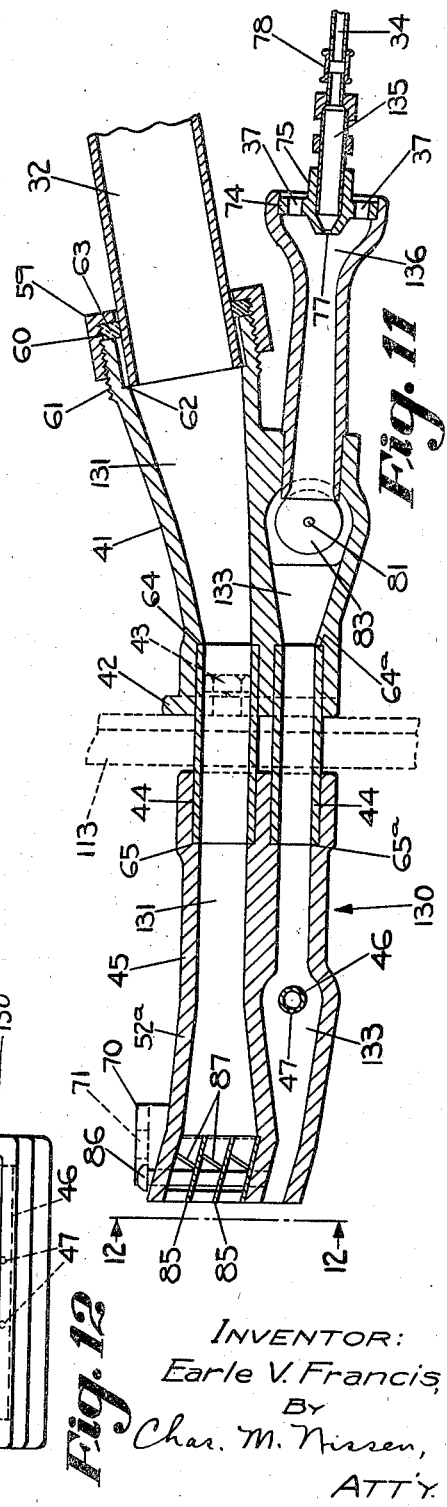
INVENTOR:
Earle V. Francis,
By
Chas. M. Nissen,
ATTY.

Patented Dec. 21, 1937

2,102,588

UNITED STATES PATENT OFFICE 2,102,588

FUEL BURNING APPARATUS

Earle V. Francis, Columbus, Ohio, assignor to The Jeffrey Manufacturing Company, a corporation of Ohio Application March 17, 1934, Serial No. 716,119

2 Claims. (Cl. 110—104)

The development of fully automatically controlled heating systems for both domestic and industrial installations, has led to many different forms of apparatus utilizing solid, liquid or gaseous fuel; and while these systems have reached a high stage of development and are of demonstrated practicability, their high cost of installation and operation, when compared to non-automatic systems, has restricted very materially their use, especially in domestic heating installations. It has therefore been the subject of much effort to produce a fully automatic heating system which may be installed and operated at a cost sufficiently low to render such a system available for practicable installation in what may be termed the average house.

With a view of reducing the operating costs of such a system, exhaustive tests have been made with various fuels suitable for use in fully automatic systems, which tests have indicated that solid fuels, especially coal, in a finally powdered condition, produce a very high heat, while being very economical from the standpoint of supply and fuel costs. Powdered coal, however, has been difficult to handle in such systems, which have been open to various mechanical troubles.

The present invention, however, provides a heating system especially designed for domestic purposes, which system will utilize powdered coal as fuel in such a manner as to give efficient combustion of the fuel, and which will assure ignition of each charge of fuel as it is introduced into the furnace, while being safe and economical in operation.

To the end of accomplishing the improved results, the invention embraces the construction of an improved type of burner for handling the powdered coal and an improved installation of fire-box in the furnace in which the burner is to be installed, which fire-box constitutes a combustion chamber of refractory or fire resisting material which is adapted to be mounted in a furnace of any standard type. Said furnace may have been either previously installed or supplied with the present improved system.

A further object of the present invention is the provision of improved ignition mechanism associated with an improved type of nozzle for projecting a mixture of air and pulverulent combustible material into a furnace combustion chamber.

A further object of the invention is the provision of improved mechanism for feeding from storage pulverulent material and mixing the same with air for delivery to a furnace for combustion therein.

Other objects of the invention will appear hereinafter, the novel features and combinations being set forth in the appended claims.

Referring to the accompanying drawings:

Fig. 2 is an enlarged detail view partly in section and partly in elevation, of the burner installation shown in Fig. 1;

Fig. 5 is a sectional plan view of the burner shown in Fig. 4 taken on the line 5—5 of Fig. 6;

Fig. 6 is a sectional elevation of the burner of Fig. 5 taken on the line 6—6 of Fig. 5;

Fig. 7 is an end view of the burner of Figs. 5 and 6, the view being taken on the plane of the line 7—7 of Fig. 6;

Fig. 10 is a view similar to Fig. 5, but showing a still further modified burner;

Fig. 11 is a sectional elevation of the burner of Fig. 10, the view being taken on the longitudinal axis of the burner;

Figure 1:
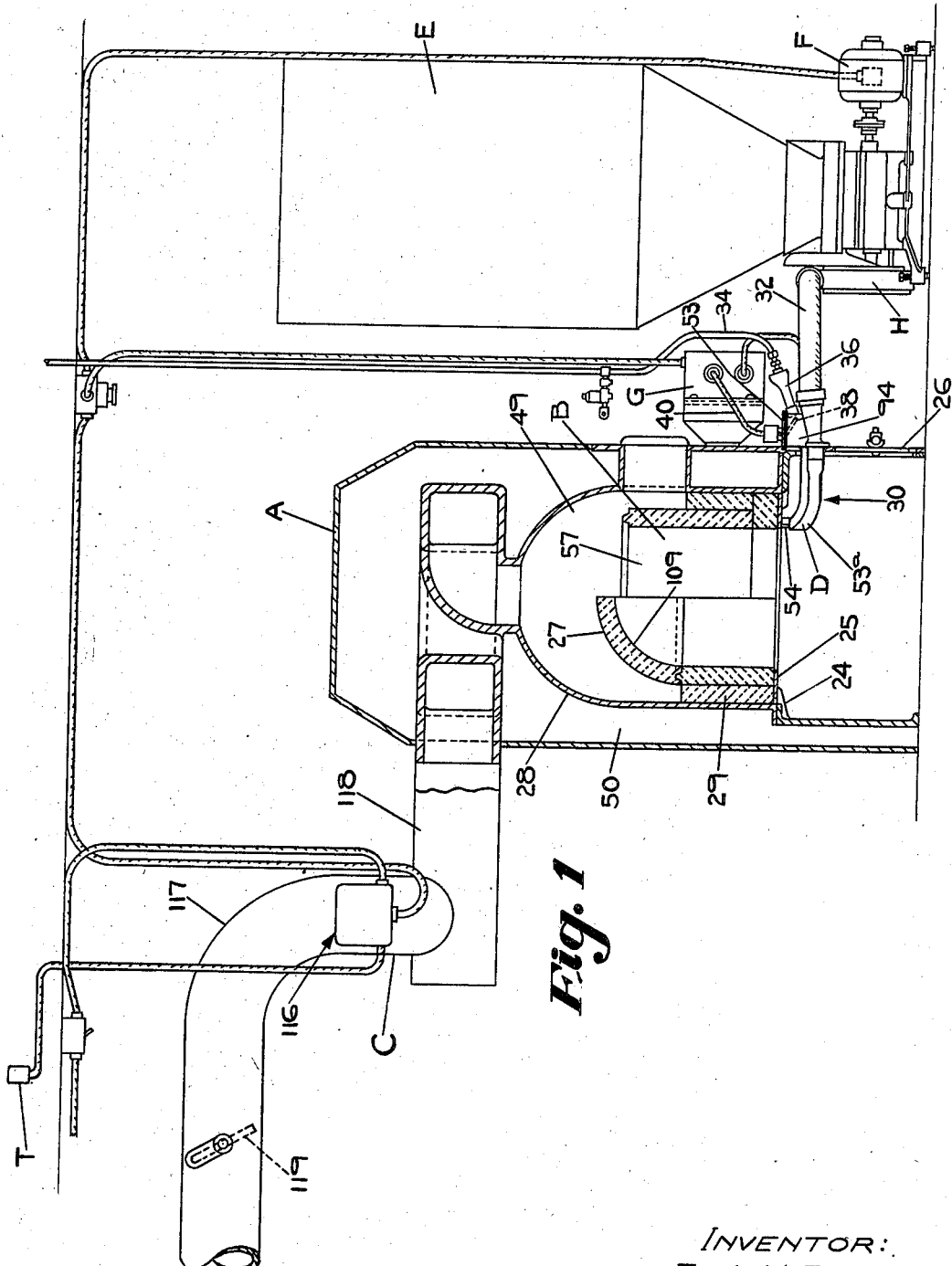
Fig. 1 is an elevational view of an automatic thermostatically controlled heating system embodying the improvements of the present invention.
Figure 3:
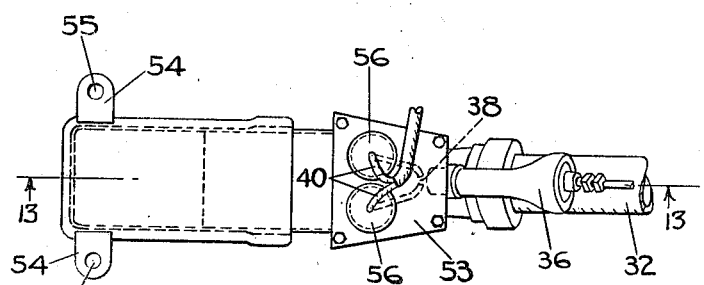
Fig. 3 is a plan view of the burner itself shown in Fig. 2.

Fig. 12 is a front end view of the burner of Figs. 10 and 11, the view being on the plane of the line 12—12 of Fig. 11; and Fig. 13 is a partial sectional elevational view of the burner of Figs. 1, 2 and 3 taken on the line 13—13 thereof.

Referring more particularly to the drawings, and first to Fig. 1, a furnace A of any standard construction, is provided with a main combustion chamber within which is a preliminary combustion or ignition chamber B of refractory material, such as fire brick, for example. The furnace A is provided with the usual stack C for withdrawal of main combustion products from the combustion chamber. The furnace A is provided with a burner D, which opens into the preliminary combustion chamber B, the burner D being adapted to burn powdered fuel supplied thereto from hopper E in which the supply of powdered fuel is stored, being blown through the burner by a blower H driven by motor F. The ignition of the fuel is automatically started by electrical ignition mechanism operated through the transformer box G, which ignition mechanism is actuated by a thermostat T.

It will be observed that the furnace A may be of the vertical type, and may be either in a hot air heating system, vapor heating system or steam heating system. While the improvements of the present invention are particularly adapted to be installed in connection with a furnace already in operation for the burning of coal in the ordinary way, it should be understood that the system may be permanently or detachably connected to a furnace when initially installed. The only changes necessary for the installation of the improved apparatus in connection with a previously installed furnace, are the removal of the usual fire grate and the provision of suitable openings for the connections such as are illustrated in Fig. 2.

In the furnace illustrated in Figs. 1 and 2, for example, suitable supports 24 are provided for supporting a ring 25, upon which ring is constructed the preliminary combustion chamber B. This ring replaces the usual grate of the furnace. Suitable openings are made through the lower portion of the furnace wall for the reception of the burner structure D, which passes through the furnace conveniently just above the ash door 26. It will be noted that the preliminary combustion chamber B is substantially round having a dome-like partial cover 27, leaving an opening 57, and is spaced away from the wall 28 of the furnace fire-box by the spacer 29, of firebrick or similar refractory material. The preliminary combustion chamber B is open at the bottom, in order to receive the flame of the combustion from the burner D.

The form of burner illustrated in Figs. 1, 2, 3 and 13 is especially adapted for the round combustion chamber mounted at the location of the usual grate bars. Referring to the details of construction of the burner, it will be seen that the burner itself embraces a nozzle 30, divided interiorly into two longitudinally extending compartments 31, 33, one of which is disposed above the other. The compartment 31 receives the supply pipe 32 through which powdered coal mixed with air is delivered to the nozzle, the compartment 33 receiving a stream of gas from a gas line 34 provided with an outlet 35, opening into a mixing chamber 36, where it is mixed with air drawn through ports 37 by the jet of gas issuing from outlet 35. Pipe 32 communicates with hopper E containing the powdered fuel supply, and while the powdered fuel compartment is shown in the burners of Figs. 5 and 6 as being the upper compartment, the burners may be installed with the powdered fuel compartment in the lower position, as indicated in Figs. 1, 2, 3 and 13.

Adjacent the outlet of the gas mixing chamber 36, is an ignition device for the gas supply, the device being either a spark gap, as illustrated at 38 in Figs. 1, 2, 3, and 13 or a glow bar 39, Figs. 5 and 6, mounted in one side of the burner nozzle. The spark gap and glow-bar are virtually interchangeable, except for necessary changes in the interconnections with the transformer which supplies the energizing current for these igniting instrumentalities. It will be noted that where a spark gap is used, it is disposed immediately adjacent the outlet of the mixing chamber 36, whereas in the case of the glow-bar, it may be advantageously positioned so that the flow of gas to be ignited will be in a direction longitudinally of the glow-bar thus exposing the greatest amounts of surface between the gases and the glow-bar; and the glow-bar is illustrated as being in the form of a loop for increased surface. Current from a suitable transformer is supplied to the igniting devices through leads 40.

Attention is now directed to Figs. 5, 6 and 7 of the drawings which illustrate a modified form of nozzle 130 which I will now describe in detail. It will be noted that the nozzle 130 is in two sections, each having a top compartment 131 and a bottom 133 similar in function to the compartments 31 and 33, respectively, of the device shown in Figs. 1, 2, 3 and 13. One of the sections 41, which may be referred to as the forward section, is provided with a flange 42 adapted to receive bolts, or equivalent attaching members 43, for attaching the nozzle to the furnace. Connecting pipes 44, 44 project through the furnace wall, and receive the rear nozzle section 45, this section extending to the interior of the furnace. The pipes 44 may be desirably flattened to occupy the minimum space at the furnace so that they may be inserted through suitable openings such as the clinker door while leaving the ash door free, or the nozzle may be inserted through the ash door.

The supply of gas coming from the gas outlet 135 may be augmented, if desired, by an auxiliary gas supply provided through pipe 46 extending across the gas compartment 133 and provided with burner ports 47. The pipe 46 is positioned adjacent the outlet end of the nozzle when an auxiliary gas supply is employed. Gas is supplied to the pipe 46 through the pipe 48.

The spark gap or glow-bar ignition devices 38 or 39 act to initially ignite the gas in the compartment 33 or 133 to start the combustion of the coal as the latter issues from the compartment 31 or 131 of nozzle 30 or 130. It being highly desirable to reduce the consumption of gas, controls are included in the control system so that the gas may be cut off during the running period of the furnace. The refractory walls of the preliminary combustion or ignition chamber become sufficiently heated during the starting period to act continuously during the running period to maintain the pulverized fuel flame. For instance, such refractory walls may reach a temperature during the running period of approximately 2400° F., so that irrespective of the temperature of the walls of the main furnace combustion chamber 49, the burning of the fuel will be maintained. Furthermore, the refractory preliminary chamber B confines the mixture of the pulverized coal and air for ignition to a limited space and initial combustion in the chamber B is effected. The outside walls 50 of the furnace casing, however, do not become heated any more than usual, irrespective of the comparatively high temperature of the preliminary chamber B.

To prevent too direct an impinging of the flame from the nozzle upon the walls of the preliminary chamber B, which if allowed would cause local overheating of the walls, it is desirable to split the incoming coal and to deflect the same in opposite directions around the walls of the preliminary chamber. For this purpose, a V-shaped deflector 51 may be inserted in the discharge end of the fuel compartment 131 of the nozzle, the sides of the nozzle flaring outwardly adjacent this deflector, as indicated at 52 in Fig. 5, thereby reducing somewhat the velocity of the fuel stream just prior to its discharge into the preliminary combustion chamber B.

With the type of nozzle shown in connection with the installation of Figs. 1 and 2, where the preliminary combustion chamber B is supported on the ring 25 and the nozzle enters the furnace below the ring, it will be noted that the nozzle is bent upwardly at 53a to direct the incoming fuel upwardly into the chamber B. It will also be seen that the fuel compartment 31 of the nozzle is disposed beneath the gas compartment 33 instead of above the latter, as the fuel compartment 131 is disposed with respect to the gas compartment 133 in Figs. 5, 6 and 7, and the auxiliary gas burner 46 is omitted. This may be included, however, if desired, and with these exceptions noted, the construction of the burner 30 of Figs. 1, 2, 3 and 13 is substantially the same as that described with reference to the detailed showings of Figs. 5, 6 and 7, the specific form of burner of Figs. 1 and 2 showing a spark gap instead of a glow-bar igniter, the spark gap electrodes being shown as inserted in the top of the burner instead of through the sides thereof, as would be the case if the electrodes were substituted for the glow-bar of Figs. 5 and 6; also the deflector 51 is omitted in the installation specifically shown in Figs. 1 and 2.

In the device of Figs. 1, 2, 3 and 13 a plate 53 may be provided for carrying the housings 56, 56 of the spark gap terminals. The nozzle is provided with an opening for receiving these terminals, and plate 53 forms a closure for this opening. Attaching flanges 54, 54, having holes 55 therein for receiving bolts 55a or equivalent attaching members, may be provided for attaching the outlet end of the nozzle to the ring 25. The spark gap 38 is relatively short to produce a hot spark, the electrodes of the gap being composed of metal of a composition usual in spark plugs. These electrodes are connected with leads 40 in housings 56, 56.

Figure 4:
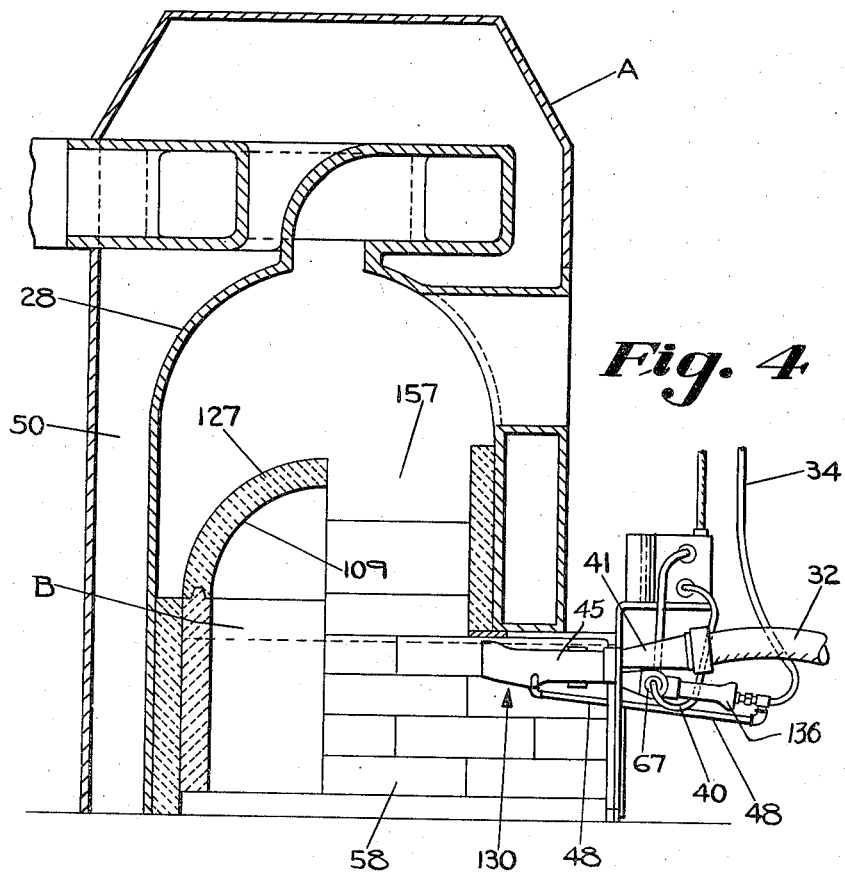
Fig. 4 is a view partly in section and partly in elevation showing an installation in a furnace of a somewhat different type of burner and fire box from that illustrated in Figs. 1 to 3.

The burner illustrated in detail in Figs. 5, 6 and 7, the construction of which has been specifically described above, is, however, primarily intended for an installation such as that illustrated in Fig. 4, wherein the preliminary combustion chamber B is built up from the floor instead of being carried by a supporting structure as shown in Fig. 1. In the installation of Fig. 4, the nozzle may be brought more directly into the combustion chamber than in the installation of Fig. 1.

In Fig. 4, the preliminary combustion chamber B is built up from the floor and is composed of fire resisting material, such as firebrick 58, and is partially covered by the cover 127, leaving the opening 157, as previously described in connection with similar opening 57 of Fig. 1 for escape of combustion products from the preliminary combustion chamber. In view of the fact that there is afforded by this construction of combustion chamber a more direct introduction of the burner into the preliminary combustion chamber, a straighter nozzle may be employed than in the installation of Fig. 1, and the nozzle illustrated in Figs. 5, 6 and 7 is well adapted for this installation. The details of this nozzle have been largely described above, but it may be noted that the fuel supply pipe 32 passes through a cap 59, internally threaded at 60 to engage the threads 61 provided on the intake end of the nozzle which is also provided with an internal shoulder 62 serving as an abutment for the end of the supply pipe 32. A tight joint between the supply pipe 32 and the nozzle is obtained by a resilient washer 63, which prevents escape of powdered coal from between the supply pipe and nozzle.

It will be observed also that the sections 41 and 45 of the nozzle are formed with internal shoulders 64, 64a and 65, 65a against which the previously mentioned connecting pipes or sections 44 abut, the sections 44 being of the same internal diameter as the internal diameter of the portions 31 and 33 in of the respective compartments 31 and 33 in which the connections 44 are received, so that a smooth and unobstructed surface is presented for the passage of both fuel and gas. It will be noted, also, in the fuel compartment 131, the bore tapers inwardly from the shoulder 62, marking the end of the supply pipe 32 to the shoulder 64, marking the beginning of the connecting pipe 44. This tapering affords a flattening of the nozzle at the connecting pipes so as to enable the insertion of the nozzle through a vertically restricted space in the furnace. The same is true for the gas compartment, where it will be seen that the intake end is substantially enlarged, as shown at 66, and uniformly tapers from the outlet of mixing chamber 36 to the shoulder 64a.

The fuel chamber 131 begins to diverge, as indicated at 52a, at a convenient point adjacent the discharge end of the nozzle, which acts to reduce the velocity of the discharging stream of fuel. In practice, this divergence begins adjacent the place where the auxiliary gas burner 46 is located in the gas compartment 33, in the event such auxiliary burner is employed. Between the shoulder 62 and the beginning of the divergence 52a, the area of the internal surface of the nozzle forming the compartment 31 is constantly substantially equal to the area of the supply pipe 32, and the area of the surface of the gas compartment is substantially constant from the constriction 66a to the auxiliary burner 46.

It will also be noted that the glow-bar 39 is mounted in a plug 67. This plug is removably held in position by a screw 68, the nozzle being apertured on each side so that the plug 67 may be inserted on either side, or wholly withdrawn and replaced by spark plugs to form the spark gap previously referred to.

The discharge end of the nozzle is provided with attaching lugs 70, 70, having holes 71, 71 therethrough for the reception of suitable attaching devices for supporting the nozzle. It may also be noted in passing that the air ports 37 are formed in a casting 74 which is inserted in the intake end of the mixing chamber 136, the casting 74 being formed with a bushing 75 for receiving the gas outlet section 135 of the gas supply line 34, the bushing 75 forming a nozzle for the section 135 and having a jet opening 77 therethrough. The auxiliary gas supply pipe 48 is connected to the main supply line 34 by means of a T-connection 78.

In Figs. 10, 11 and 12 I have shown the burner of Figs. 5, 6 and 7. However, in these figures, the plug 67 has been replaced by spark plugs 79 and 80 having terminals or electrodes 81 and 82 defining a hot spark gap therebetween, the electrodes being mounted in insulating plugs 83 and 84. Also, the V-shaped baffle 51 has been replaced by spacers 85, 85, held in suitable spaced-apart position by a pin 86, and supporting a plurality of baffles 87. This arrangement of baffles may be employed desirably, if the nozzle is installed in a rectilinear, instead of a round, firebox, and, by breaking up the flow of powdered fuel, prevents the flame from the nozzle banking up on the back of the firebox. Otherwise, the entire construction is the same as the nozzle of Figs. 5, 6 and 7.

Figure 8:
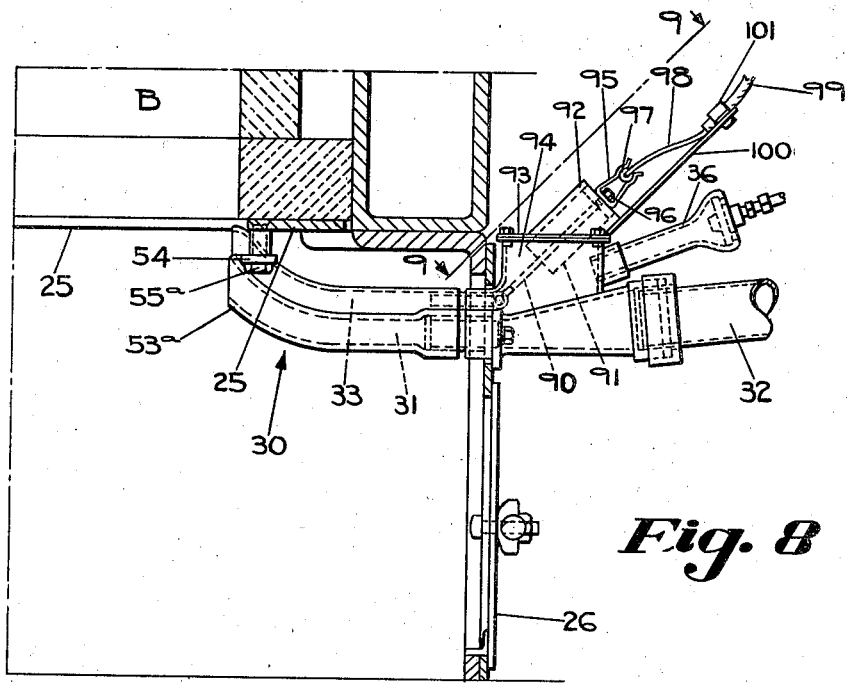
Fig. 8 is a view similar to Fig. 2, but showing a burner provided with a different type of ignition device.
Figure 9:
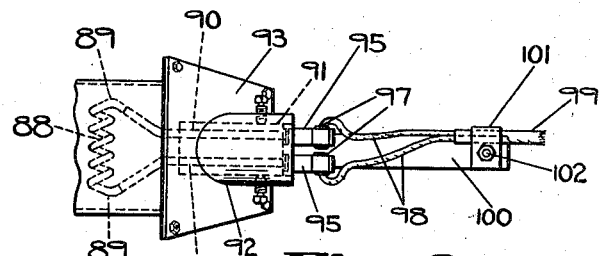
Fig. 9 is a fragmentary top view of the burner shown installed in Fig. 8, the view being on the line 9—9 of Fig. 8.

Figs. 8 and 9 show an installation very similar to the installation of Figs. 1, 2, 3 and 13, the spark gap in the nozzle structure being replaced by a modified form of glow-bar which may be employed alternatively with the spark gap or glow-bar of Figs. 5, 6 and 7. It will be seen that the glow-bar 88 of this modification is mounted between arms 89, 89 of leads 90, 90, so as to extend transversely of the flow of gas issuing from mixing chamber 36, instead of longitudinally thereof, as previously described. It will be understood that in any form of the glow-bar, it is constructed of a high resistance alloy which becomes incandescent upon passage of a current therethrough. Thus the well-known nickel-chromium resistance alloys, such as known to the trade as "nichrome" or "chromel" may be satisfactorily employed.

The leads 90, 90 are mounted in a supporting insulating plug 91, secured by set screws in a cylindrical portion 92 forming a part of plate 93, which plate is adapted to fit over the opening provided in the burner nozzle for the insertion of the glow-bar and to close such opening.

It will be seen that the portion 94 of the nozzle of Figs. 1, 2 and 8 forms, in effect, a housing for whatever ignition devices there may be employed.

The leads 90, 90, Figs. 8 and 9, are provided with clip terminals 95, 95, which are secured in place by nuts 96 and which hold the contacts 97, 97 of conductors 98, 98, leading from a suitable source of current, such as a transformer. In a usual manner, conductors 98, 98 may be enclosed in a sheath forming a single cable 99, and a brace 100 may be provided therefor, this brace extending from the plate 93, being secured thereto, to the cable 99, being secured to the latter by means of a clamp 101 attached to brace 100 by a bolt, or equivalent member, 102.

In the operation of the device comprising my invention as illustrated in Figs. 1, 2, 3 and 13 of the drawings, a mixture of air and pulverized fuel will be fed through compartment 31 of burner 30 and be directed into the preliminary combustion or ignition chamber B. Simultaneously a mixture of air and gas will be fed into the mixing chamber 36 and will be ignited and flow through and out of the compartment 33. This will produce a flame at the outlet of compartment 33 which will ignite the mixture of air and pulverized fuel as it issues from compartment 31, thereby insuring an early and complete combustion of the pulverized fuel. In addition, since the mixture of gas and air is ignited within the compartment 33 there will be a preheating of the mixture of air and pulverized coal while it is still in the burner 30 which will aid in an early ignition thereof after it leaves said burner 30.

In the devices of Figs. 5, 6 and 7 and Figs. 10, 11 and 12, there will be, in addition, a spreading of the mixture of air and pulverized fuel as it issues from the compartment 131, nozzle 130 and an augmenting of the flame which issues from compartment 133 of said nozzle 130.

The burning of the pulverized fuel mixed with air will heat the preliminary combustion chamber B to a high temperature such that after a short starting period the gas supply may be shut off and continued combustion of the pulverized coal mixed with air will be insured by the hot walls of said preliminary combustion chamber.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. Apparatus for burning powdered fuel comprising a burner adapted to communicate with the interior of a furnace and including a nozzle, substantially horizontal means within the nozzle comprising an integral wall extending longitudinally therethrough for dividing the nozzle into a pair of axially spaced separate passages having separate but adjacent discharge outlets, means for introducing powdered fuel and air into one of the passages, means for introducing a combustible mixture of gas and air into the other passage, the said passages being substantially enlarged at their intake end and tapering therefrom into a relatively restricted area for facilitating introduction of fuel and gas into the respective passages, and means for igniting said mixture while within said other passage to preheat the powdered fuel while in its passage and ignite it as it issues therefrom.

2. Apparatus for burning powdered fuel comprising a burner adapted to communicate with the interior of a furnace and including a nozzle, means within the nozzle extending longitudinally therethrough for dividing the nozzle into a pair of axially spaced separate passages, having adjacent discharge outlets, substantially horizontal means for introducing powdered fuel and air into one of the passages, means for introducing a combustible gas and air into the other of the passages, and an elongated electrical heating element in the gas passage extending in the direction of flow of the gas for igniting the gas within said passage upon passage of electricity through the heating element.

EARLE V. FRANCIS.